United States Patent
Essig

(10) Patent No.: US 6,799,706 B2
(45) Date of Patent: Oct. 5, 2004

(54) CARRYING TRAY ASSEMBLY FOR A SPORT UTILITY VEHICLE

(75) Inventor: Richard C. Essig, Berthoud, CO (US)

(73) Assignee: Bestop, Inc., Broomfield, CO (US)

( * ) Notice: Subject to any disclaimer, the term of this patent is extended or adjusted under 35 U.S.C. 154(b) by 61 days.

(21) Appl. No.: 10/280,380

(22) Filed: Oct. 25, 2002

(65) Prior Publication Data

US 2004/0079779 A1 Apr. 29, 2004

(51) Int. Cl.⁷ .............................................. B60R 11/00
(52) U.S. Cl. ...................... 224/550; 296/37.5; 248/503
(58) Field of Search ................... 224/545, 548, 224/552, 555, 558, 494, 500, 401–405, 488, 321–327, 309, 553, 529, 530, 311, 317, 574, 566, 550; 292/DIG. 43; 296/37.5, 37.6; 108/44; 248/503, 352

(56) References Cited

U.S. PATENT DOCUMENTS

| | | | | |
|---|---|---|---|---|
| 5,037,153 A | * | 8/1991 | Stark ......................... | 296/37.6 |
| 5,269,447 A | * | 12/1993 | Gower et al. ................ | 224/542 |
| 5,381,940 A | * | 1/1995 | Wright ........................ | 224/542 |
| 5,904,281 A | * | 5/1999 | Mooers ....................... | 224/526 |
| 6,050,202 A | * | 4/2000 | Thompson ................... | 108/44 |
| 6,378,748 B1 | * | 4/2002 | Cox ............................ | 224/511 |
| 6,546,598 B1 | * | 4/2003 | Nakanou et al. ............ | 224/281 |
| 6,598,704 B2 | * | 7/2003 | Hansen ....................... | 182/113 |
| 6,629,726 B2 | * | 10/2003 | Johnston ................ | 297/188.06 |
| 6,634,691 B2 | * | 10/2003 | Henderson ................. | 296/37.6 |

* cited by examiner

Primary Examiner—Lien Ngo
(74) Attorney, Agent, or Firm—W. Scott Carson

(57) ABSTRACT

A carrying tray assembly for the rear of a sport utility vehicle. The assembly is suspended from sections of the sports bar arrangement and permits easy access to any items on the tray of the assembly. The assembly also permits other gear to be placed below the tray on the floor of the rear deck of the vehicle and covered with a tonneau if desired to protect the gear from the elements. The assembly has front and rear supporting systems that are adjustable to fit a variety of sport bar designs. Additionally, because the tray is suspended from sections of the sports bar arrangement rearwardly of the driver's and front passenger's seats, traditional half tops and windscreens can also be used on the vehicle at the same time as the carrying tray assembly.

12 Claims, 5 Drawing Sheets

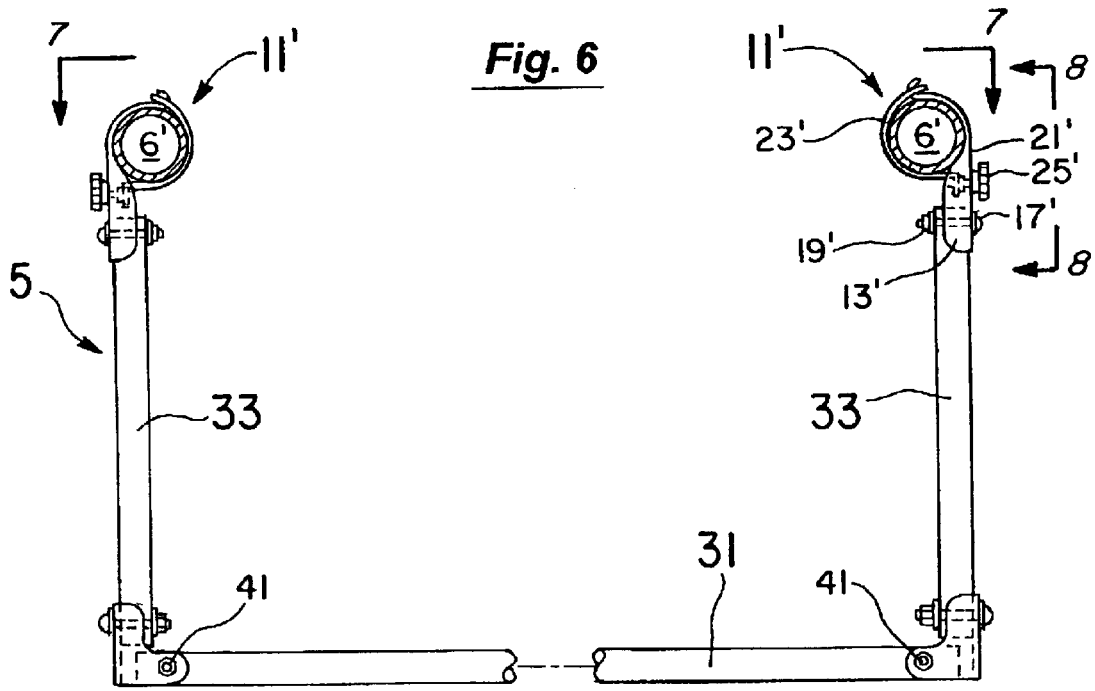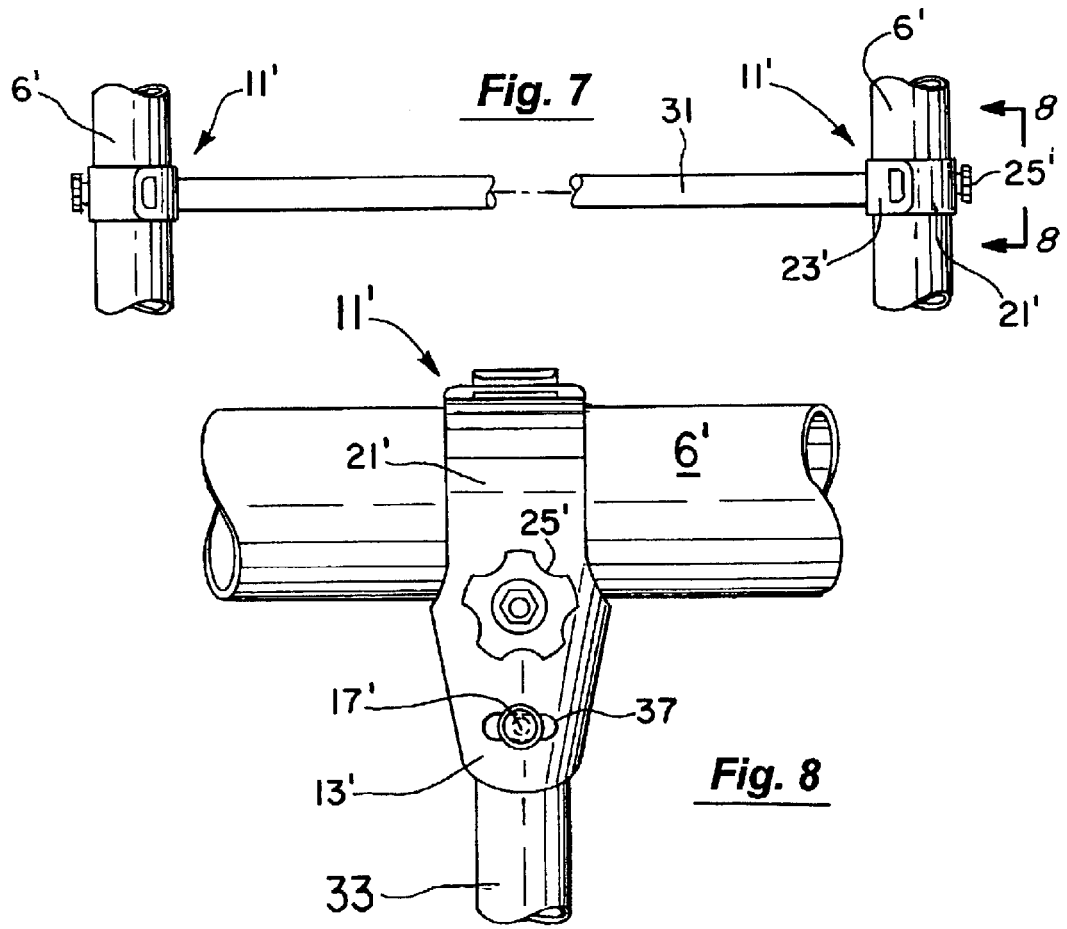

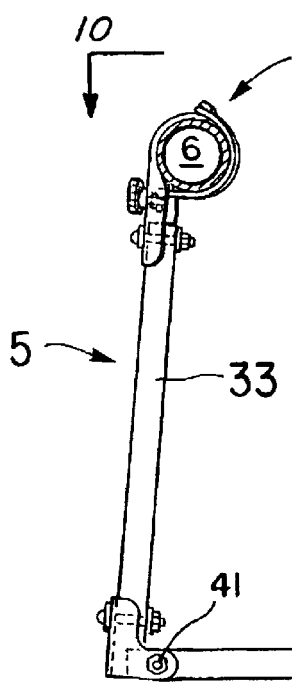
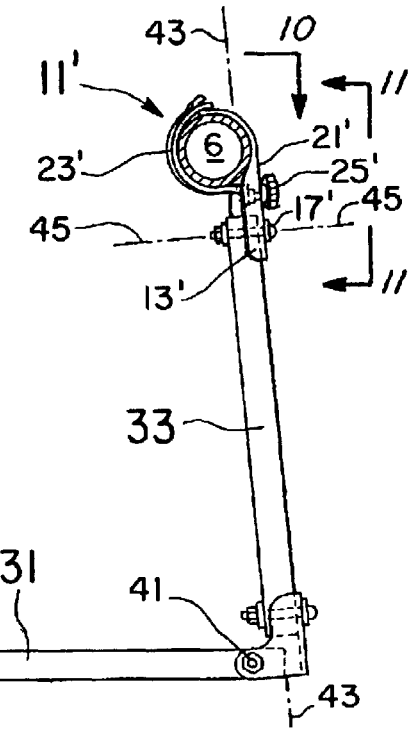
Fig. 9
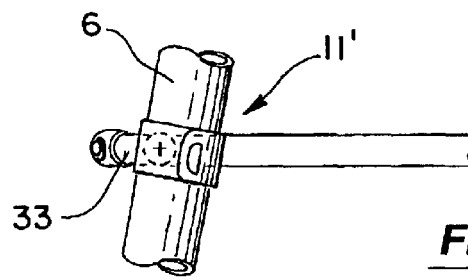
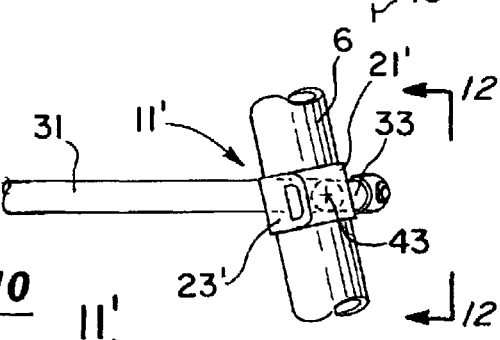
Fig. 10
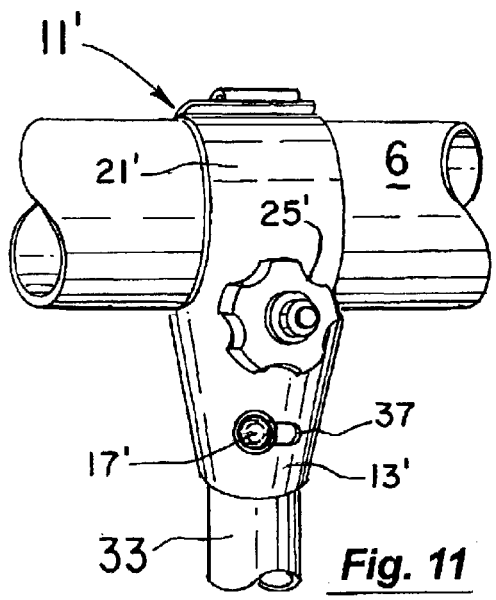
Fig. 11    Fig. 12

CARRYING TRAY ASSEMBLY FOR A SPORT UTILITY VEHICLE

BACKGROUND OF THE INVENTION

1. Field of the Invention

This invention relates to the field of carrying tray assemblies for sport utility vehicles and more particularly to the field of such tray assemblies that are adjustable to fit different vehicles.

2. Discussion of the Background

In most sport utility vehicles, carrying or storage space for gear and other items for camping, hunting, and the like is at a premium. Presently, it is common just to stack or pile as much gear as possible in the open rear of the vehicle. In doing so, it can become difficult to find and retrieve individual items (e.g., a coat or flashlight) without having to move the bulk of the stored gear out of the way. Additionally, it is usually necessary to cover the complete rear of the vehicle if any of the stored gear (e.g., clothing) needs to be protected from exposure to the elements. However, in nearly all cases, many of the items (e.g., fishing tackle boxes) can easily withstand such exposure but are nevertheless covered up with the other items. The top or other covering over the rear of the vehicle must then be completely or at least partially removed to reach even the items that really could have been left exposed for easy access.

With this and other problems in mind, the present invention was developed. With it, gear and other equipment can be carried above the rear deck of the vehicle in a tray suspended from sections of the sports bar arrangement. Access to the items in the tray is unrestricted while at the same time, other items that need to be protected from the elements can be placed below the tray on the floor of the rear deck and covered with traditional accessories such as a tonneau. Additionally, because the tray is suspended from the sports bar arrangement behind the driver's and front passenger's seats, half tops and windscreens can also still be concurrently used on the vehicle to protect the occupants from the elements.

SUMMARY OF THE INVENTION

This invention involves a carrying tray assembly for the rear of a sport utility vehicle. The assembly is suspended from sections of the sports bar arrangement and permits easy access to any items on the tray of the assembly. The assembly also permits other gear to be placed below the tray on the floor of the rear deck of the vehicle and covered with a tonneau if desired to protect the gear from the elements. The assembly has front and rear supporting systems that are adjustable to fit a variety of sport bar designs. Additionally, because the tray is suspended from sections of the sports bar arrangement rearwardly of the driver's and front passenger's seats, traditional half tops and windscreens can also be used on the vehicle at the same time as the carrying tray assembly of the present invention.

BRIEF DESCRIPTION OF THE DRAWINGS

FIG. 6 illustrates the members of the front support system for the tray adjusted to be in a substantially orthogonal relationship with each other.

FIG. 7 is a plan view taken along line 7—7 of FIG. 6.

FIG. 8 is an enlarged view of the clamp member of the front support system taken along line 8—8 of FIGS. 6 and 7.

FIG. 9 is a view similar to FIG. 6 illustrating the members of the front support system in positions adjusted to fit a sports bar arrangement in which the horizontal sections are closer to one another than in the arrangement of FIG. 6.

FIG. 10 is top view taken along line 10—10 of FIG. 9 illustrating how the horizontal sections of the sports bar arrangement of FIG. 9 are slanted toward each other from the rear of the vehicle toward the front.

FIG. 11 is a view similar to FIG. 8 showing the clamp member in a rotated position on the vertical member of the front support system to align it with the inwardly slanted horizontal section of the sports bar arrangement of FIG. 9.

FIG. 12 is an enlarged view taken along line 12—12 of FIG. 10 with the substantially horizontal section of the sports bar arrangement of FIG. 10 inclined upwardly from the rear of the vehicle toward the front and with the clamp member further adjusted to accommodate this inclination of the sports bar section.

DETAILED DESCRIPTION OF THE INVENTION

Figure 1:
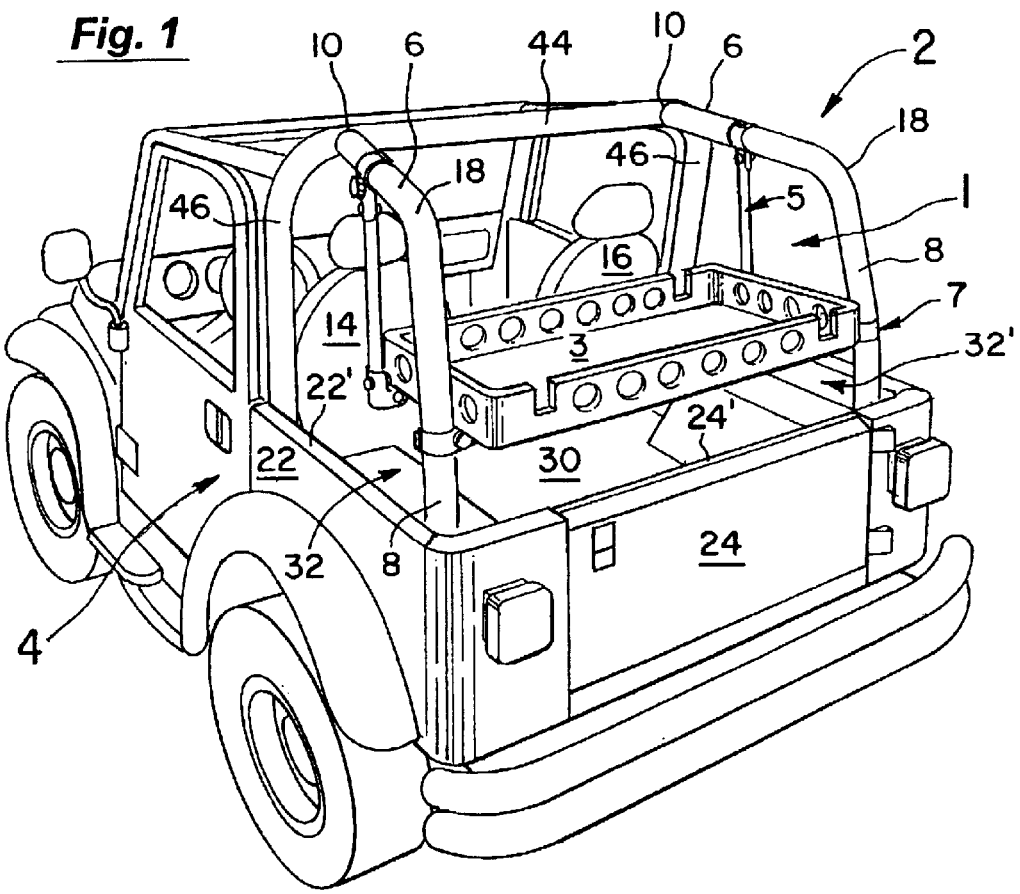
FIG. 1 is a rear perspective view of the carrying tray assembly of the present invention suspended from the sports bar arrangement of a vehicle.

The carrying tray assembly 1 of the present invention is shown in FIG. 1 supported on the sports bar arrangement 2 in the rear of the vehicle 4. The sports bar arrangement 2 as illustrated includes substantially horizontal sections 6 and substantially vertical sections 8 on each side of the vehicle 4. The horizontal sections 6 extend rearwardly from respective front locations 10 adjacent the driver's seat 14 and front passenger's seat 16 to rearward locations 18 adjacent the rear of the vehicle 4. The vertical sections 8 of the sports bar arrangement 2 then extend downwardly from the respective locations 18 to the body of the vehicle 4.

Figure 2:
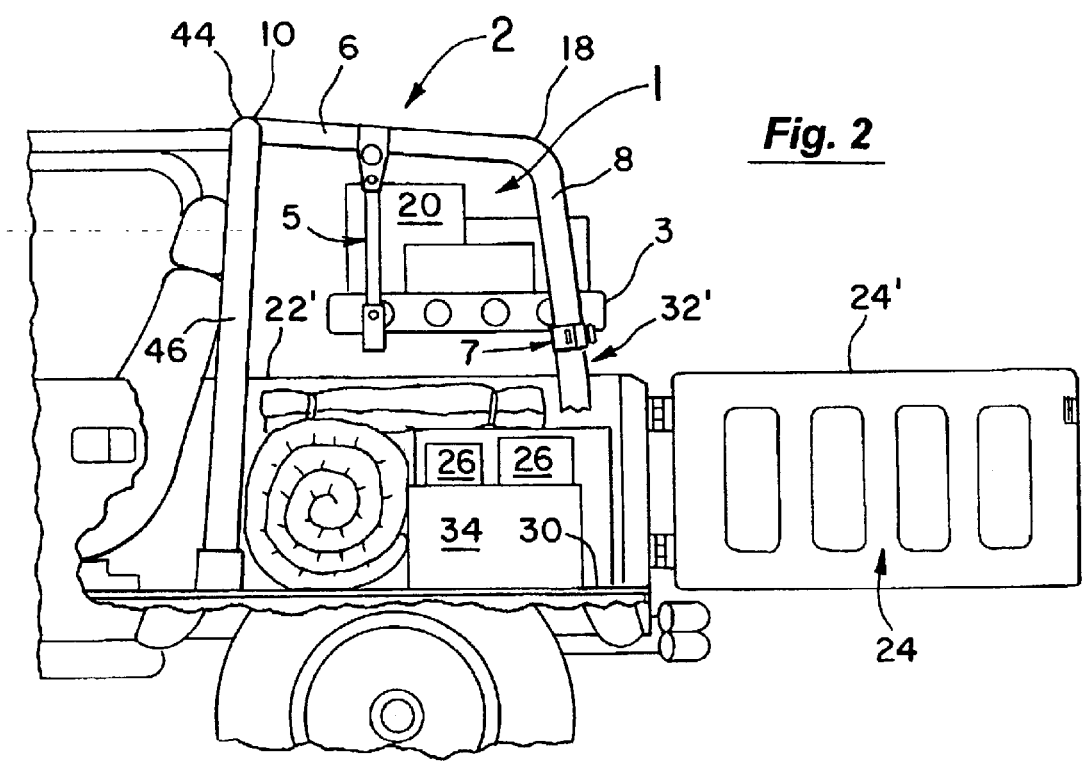
FIG. 2 is a side elevational view of the carrying tray assembly of FIG. 1 with items of gear placed on the tray of the assembly and on the rear deck of the vehicle below the tray.

In use as illustrated in FIG. 2, boxes and other items of gear 20 can be placed in the tray 3 of the assembly 1. The tray 3 in the preferred embodiments is supported in a horizontal position above the sides 22 and closed tailgate 24 (see FIG. 1) of the body of the vehicle 4. In this manner, small items of gear such as the containers 26 of FIG. 2 can be placed in the storage space adjacent the floor or rear deck 30 of the vehicle 4 through the horizontally extending gap 32, 32' of FIG. 1. Larger items such as the cooler 34 in FIG. 2 can also be placed under the tray 3 by simply opening the tailgate 24. This spacing of the tray 3 to create gap 32, 32' in FIG. 1 aids in loading, finding, and retrieving gear items from the rear deck 30 of the vehicle 4. This is particularly true in regard to smaller items such as the containers 26 which can be handled without even having to open the tailgate 24.

Figure 3:
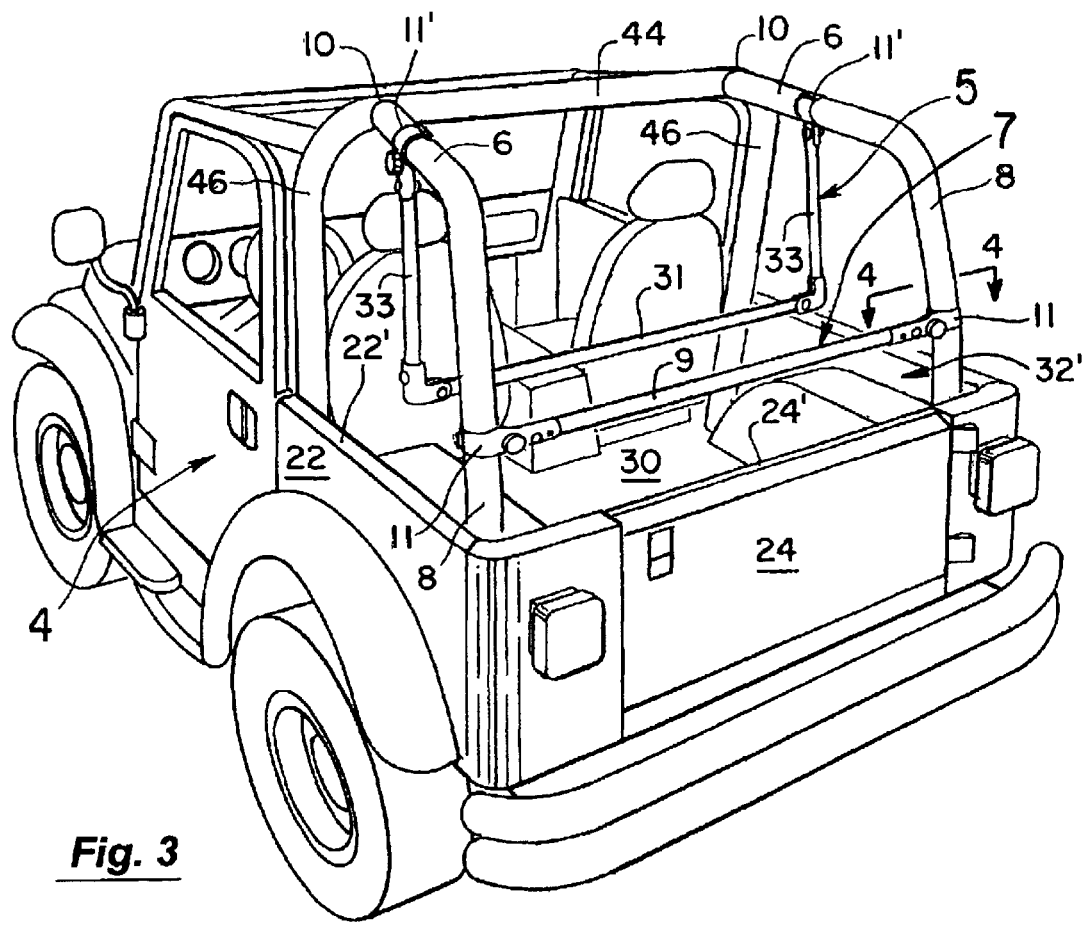
FIG. 3 is a view similar to FIG. 1 but with the tray of the assembly removed to better illustrate the front and rear support systems for it.
Figure 4:
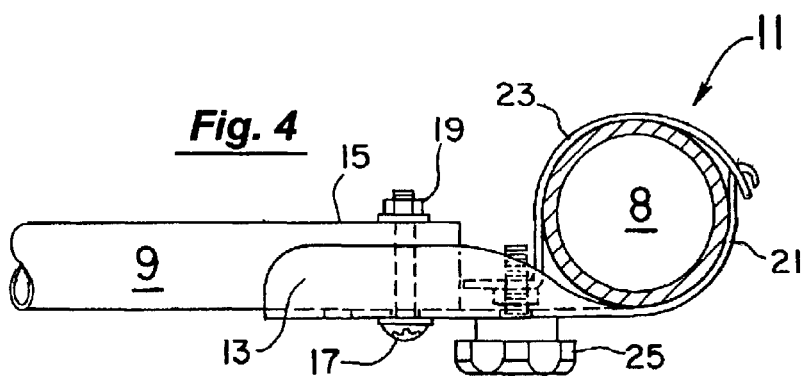
FIG. 4 is an enlarged view taken along line 4—4 of FIG. 3 showing details of the clamp member that removably attaches the horizontal member of the rear support system to the vertical sections of the sports bar arrangement.
Figure 5:
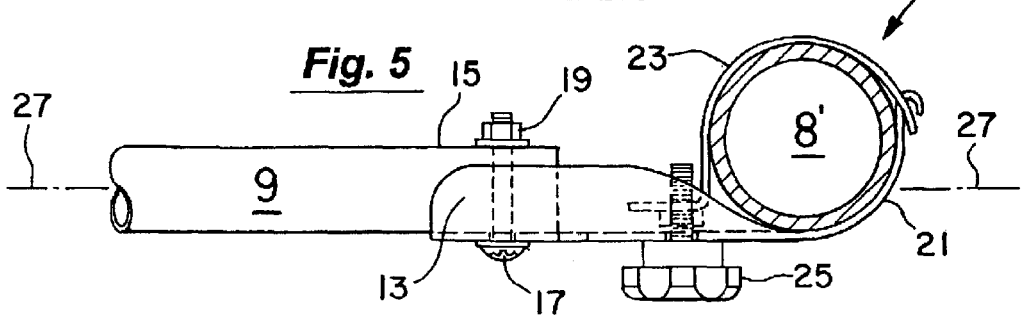
FIG. 5 is a view similar to FIG. 4 showing the clamp member adjusted to an expanded position on the horizontal member to effectively adjust the length of the rear support system to fit varying sizes of sports bar designs.

The carrying tray assembly 1 as illustrated in FIG. 1 includes the tray 3 and the front and rear support systems 5 and 7. The rear support system 7 as best seen in FIG. 3 has an elongated member 9 that extends horizontally between the vertical sections 8 of the sports bar arrangement 2. The member or bar 9 is removably attached to the respective vertical sections 8 by clamp members 11. Each clamp member 11 as shown in FIG. 4 has a stem portion 13 partially surrounding an end 15 of the member 9 and secured to the end 15 by an arrangement such as bolt 17 and nut 19. In use, the interlocking clamp sections 21 and 23 of each clamp member 11 (see FIG. 4) are positioned about the vertical section 8 and tightened by knob 25 to hold the clamp 11 securely in place. Each clamp member 11 on each end 15 of the horizontal member 9 (see FIG. 5) is adjustable along the longitudinal or horizontal axis 27 of the member 9. In this way, the length of the rear support system 7 can be expanded or shortened to fit vertical sections on different sports bar arrangements such as 8' in FIG. 5 that may be spaced apart at different distances from those of FIG. 4.

As mentioned above, the horizontally extending member 9 of the rear support system 7 is preferably spaced above the body of the vehicle 4 (including the closed tailgate 24) to create the rear gap 321. This gap 321 then allows for easy rear loading and retrieving of gear items (particularly smaller ones such as 26 in FIG. 2) from the storage area under the tray 3 on the rear deck 30 of the vehicle 4. It is also noted that this spacing of the tray 3 above the sides 22 and tailgate 24 of the vehicle 4 will permit the user to place smaller items such as 26 in this area and then cover them with a traditional tonneau to protect them from the elements. In this regard, the support systems 5 and 7 of the carrying tray assembly 1 of the present invention (see FIGS. 1 and 2) are above the top edges 22' and 24' of the sides 22 and tailgate 24. Consequently, the carrying tray assembly 1 will not interfere with the attachment of a conventional tonneau over the rear deck 30 at the level of these upper edges 22'.

The front support system 5 of the carrying tray assembly 1 of the present invention as best seen in FIGS. 1 and 3 preferably includes the horizontally extending member 31 (see FIG. 3) and the pair of vertical members 33. The upper ends of the vertical members 33 are removably attached by clamps members 11' to the respective horizontal sections 6 of the sports bar arrangement 2. In this manner, the front support system 5 of members 31 and 33 is suspended downwardly from the horizontal sections 6 preferably about midway along the sections 6. The points of suspension can be closer to the front locations 10 in FIGS. 1–3 if desired but preferably are still spaced rearwardly thereof and rearwardly of the cross member 44 of the sports bar arrangement 2. In this way, a conventional half top (over the driver and front passenger) and/or windscreen (directly behind the driver and front passenger) can be attached to the cross member 44 as well as vertical members 46 without any interference from the carrying tray assembly 1. Additionally, if desired, the complete rear of the vehicle 4 including the carrying tray assembly 1 can be covered by a conventional top.

Like the rear support system 7 for the carrying tray assembly 1, the front support system 5 is adjustable to accommodate sports bar arrangements in which the horizontal sections such as 6 are spaced apart different distances. In this regard and referring to FIGS. 6–8, the adjustable front support system 5 of the preferred embodiment is shown in an orthogonal set up with the horizontal member 31 and vertical members 33 at right angles. In this position, the clamp members 11' in FIG. 6 on the upper ends of the vertical members 33 are removably attachable to the horizontal sections 6' of the sports bar arrangement. This is accomplished substantially in the same manner as the clamp member 11 in FIG. 4. That is, the stem portions 13' of clamp members 11' in FIGS. 6–8 partially surround each upper end of vertical members 33 and are secured thereto by bolt 17' and nut 19'. Additionally, the clamp sections 21' and 23' of FIG. 6 as in FIG. 4 are positioned about the horizontal sections 6' and tightened securely in place by knobs 25'. In the orthogonal relationship of FIGS. 6–8, the bolt 17' (see FIG. 8) is substantially centered in the slot 37 in the stem portion 13' of each clamp member 11'.

In mounting the adjustable front support system 5 to a sports bar arrangement like 2 in FIGS. 1–5 and 9–10 (in which the horizontal sections 6 are laterally closer to each other than in FIG. 6), the vertical members 33 are pivoted inwardly from the orthogonal positions of FIG. 6. This is accomplished by rotating the vertical members 33 about the horizontal axes 41 relative to the elongated member 31 (see FIG. 9). The horizontal axes 41 in this regard are substantially perpendicular to the longitudinal axis of the elongated member 31. Additionally, if the horizontal sections 6 are inclined toward each other from the rear of the vehicle 4 toward the front as illustrated in FIG. 10, the clamp members 11' can be rotated about the longitudinal axis 43 of each vertical member 33 (compare again FIGS. 6 and 9). This rotation as best seen in FIG. 11 is accomplished by rotating the clamp member 11' so that the bolt 17', for example, is positioned closer to the left end of the slot 37 as in FIG. 11. Further, if each section 6 of the sports bar arrangement 2 as in FIGS. 1 and 10 is also inclined upwardly from the rear of the vehicle 4 toward the front, the clamp members 11' as illustrated in FIG. 12 can be rotated about the axis 45 of the bolt 17' (see FIGS. 9 and 12). The axis 45 in this regard is also substantially perpendicular to the longitudinal axis 43 of the vertical member 33. In this manner and with the clamp members 11' of the preferred embodiments, the front support system 5 can be attached to and suspended from any number of sports bar designs that have different spacings and/or alignments of their horizontal sections corresponding to the illustrated ones 6 and 6'.

Figure 13:
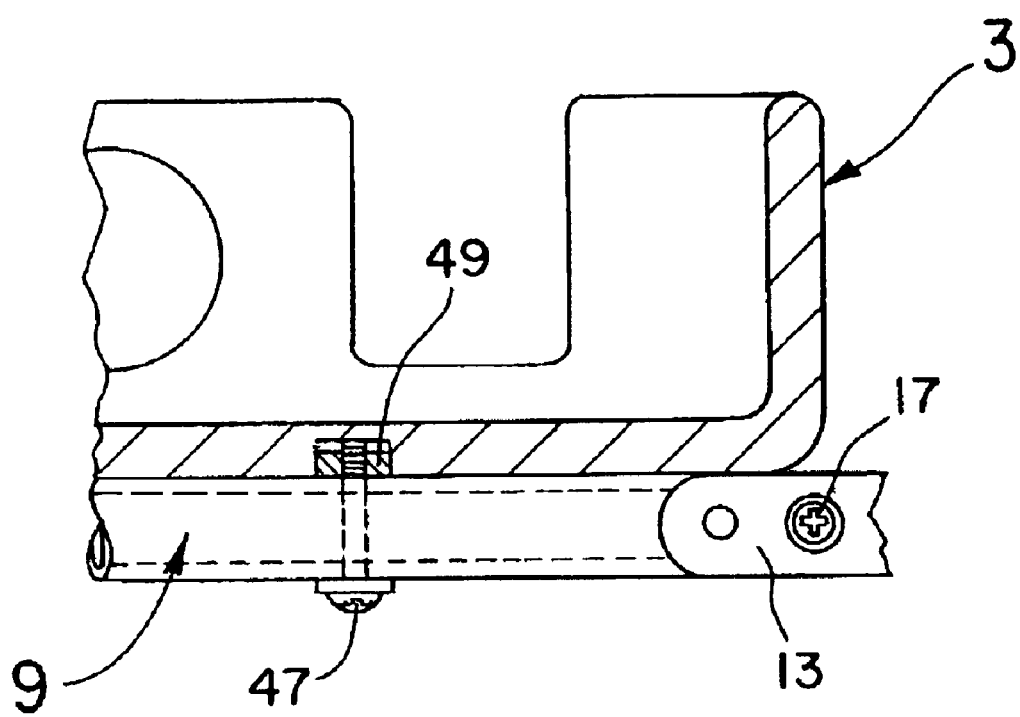
FIG. 13 is an enlarged view of a corner area of the tray of FIG. 1 illustrating one manner in which the tray can be rigidly attached and anchored to the horizontal member of the rear support system.

In most applications, the various parts of the carrying tray assembly 1 can be rigidly tightened to each other after the assembly 1 is positioned on the sports bar arrangement. That is, the various parts (e.g., bolt 17' and nut 19' in FIG. 6) may first be loosened relative to each other to make the necessary adjustments to fit the specific sports bar design. They can thereafter be tightened as desired. In the assembly 1 of the present invention, the rear support system 7 is preferably used as the anchor for the assembly 1. In this regard, the elongated bar 9 of the rear support system 7 can be rigidly secured to the vertical sections 8 of the sports bar arrangement 2. The body of the tray 3 is then preferably secured in a rigid manner (e.g., bolt and nut arrangement 47 and 49 of FIG. 13) to the elongated member 9 and similarly to the front support system 5. The entire assembly 1 of tray 3, front support system 5, and rear support system 7 then has substantially rigid, structural integrity in its attachment to the sports bar arrangement.

While several embodiments of the present invention have been shown and described in detail, it to be understood that various changes and modifications could be made without departing from the scope of the invention.

I claim:

1. A carrying tray assembly in combination with a vehicle, said vehicle having a body, a driver's seat, a front passenger seat, a rear deck, and a sports bar arrangement with substantially horizontal and substantially vertical sections on each side of the vehicle, said horizontal sections extending rearwardly from first locations respectively adjacent the driver's seat and the front passenger's seat to second locations adjacent the rear of the vehicle, said vertical sections of the sports bar arrangement extending downwardly from the respective second locations of the horizontal sections to the body of the vehicle, said carrying tray assembly including:

a tray, a rear support system attached to and extending between the vertical sections of the sports bar arrangement, and a front support system suspended downwardly from the horizontal sections of the sports bar arrangement, said tray being supported in a substantially horizontal position over the rear deck of the vehicle on said front and rear support systems.

2. The combination of claim 1 wherein said front support system is suspended downwardly from the horizontal sections of the sports bar arrangement between the first and second locations of each horizontal section.

3. The combination of claim 2 wherein said front system support system is suspended downwardly from the horizontal sections substantially midway between the first and second locations of each horizontal section.

4. The combination of claim 1 wherein the rear support system extending between the vertical sections of the sports bar arrangement is spaced above the body of the vehicle to create a gap therebetween wherein a gear and other items can be placed through said gap onto the rear deck of the vehicle below the horizontally extending tray.

5. The combination of claim 4 wherein said rear support system includes a horizontally extending member with first and second ends and a clamp member on each end removably attachable to the respectively vertical sections of the sports bar arrangement.

6. The combination of claim 5 wherein said horizontal member of said rear support system extends along an axis and at least one of said clamp members is adjustably positionable along said axis relative to an end of the horizontal member wherein said horizontal member can be attached to vertical sections of sport bar arrangements spaced apart at different distances.

7. The combination of claim 6 wherein both clamp members are adjustably postionable along said axis relative to respective ends of the horizontal member.

8. The combination of claim 2 wherein said front support system includes a pair of vertical members with first and second ends, said front support system further including a clamp member on the first end of each vertical member, each clamp member being removably attachable to the respective horizontal sections of the sports bar arrangement to thereby suspend said vertical members downwardly from said horizontal sections of said sports bar arrangement.

9. The combination of claim 8 wherein said front support system further includes a horizontal member with first and second ends, said horizontal member being pivotably attached at the respective ends thereof to the second end of the respective vertical member wherein said vertical members can be pivoted relative to said horizontal member about respective horizontal axes to vary the horizontal distance between the first ends of the vertical members wherein said clamp members on the first ends of said vertical members can be attached to horizontal sections of sports bar arrangements spaced apart at different distances.

10. The combination of claim 8 wherein said vertical members extend along respective longitudinal axes and said clamp members are mounted to the respective first ends of the vertical members for rotation about the respective longitudinal axes.

11. The combination of claim 10 wherein each clamp member is mounted to the respective vertical member for pivotal movement about an axis substantially perpendicular to the respective longitudinal axes.

12. The combination of claim 8 wherein said vertical members extend along respective longitudinal axes and said clamp members are mounted to the respective first ends of the vertical members for rotation about axes substantially perpendicular to the respective longitudinal axes.

* * * * *